United States Patent [19]

Steere, Jr.

[11] 4,171,006
[45] Oct. 16, 1979

[54] FLUID METERING VALVE

[75] Inventor: Robert E. Steere, Jr., Boonton, N.J.

[73] Assignee: Silicon Technology Corporation, Oakland, N.J.

[21] Appl. No.: 840,781

[22] Filed: Oct. 11, 1977

[51] Int. Cl.² ............................................. F16K 7/06
[52] U.S. Cl. .............................. 137/595; 137/614.11; 251/8
[58] Field of Search ...................... 251/4–10; 137/595, 614.11

[56] References Cited

U.S. PATENT DOCUMENTS

| 2,356,865 | 8/1944 | Mason | 251/9 X |
| 2,582,917 | 1/1952 | Aagaard | 137/495 |
| 2,827,919 | 3/1958 | Rice et al. | 137/505.47 |
| 2,902,248 | 9/1959 | Barton et al. | 251/4 X |
| 2,954,028 | 9/1960 | Smith | 251/8 X |
| 3,774,876 | 11/1973 | Melsheimer | 251/8 |

Primary Examiner—Martin P. Schwadron
Assistant Examiner—Richard Gerard
Attorney, Agent, or Firm—Amster, Rothstein & Engelberg

[57] ABSTRACT

The present invention is related to a fluid metering valve that is specifically constructed to provide fine metering at extremely low flow rates while still providing a full shut-off capability. The fluid metering valve of the present invention is specifically adapted to be utilized in conjunction with corrosive fluids or fluids containing suspended solid particles that would otherwise damage or clog a comparable precision needle valve.

13 Claims, 13 Drawing Figures

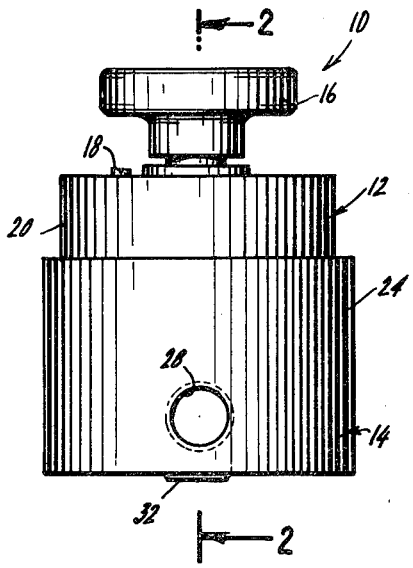
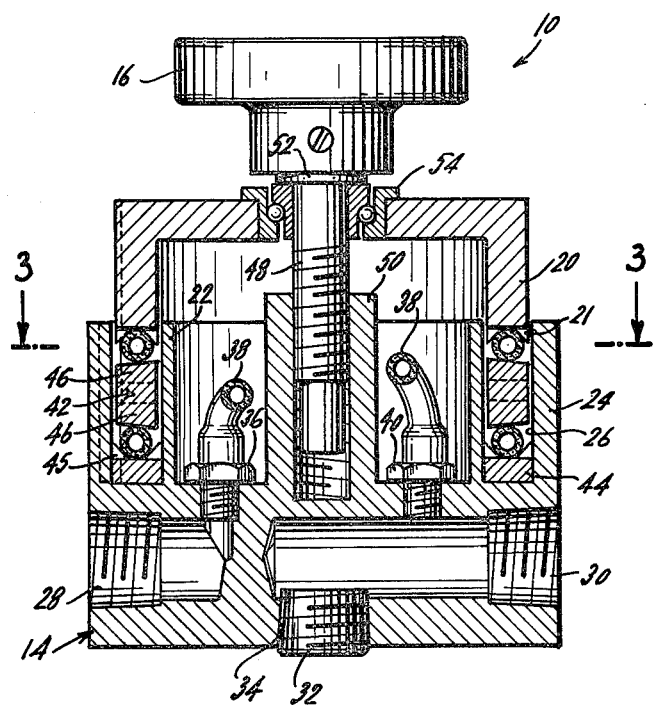
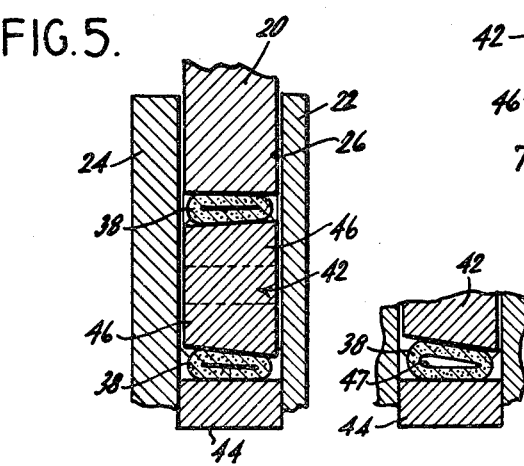
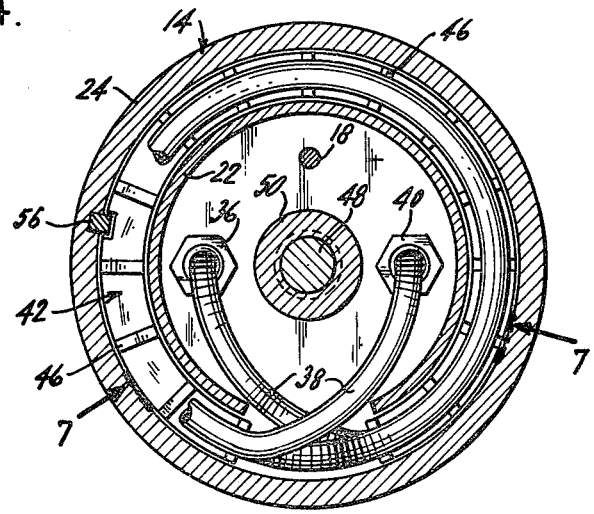

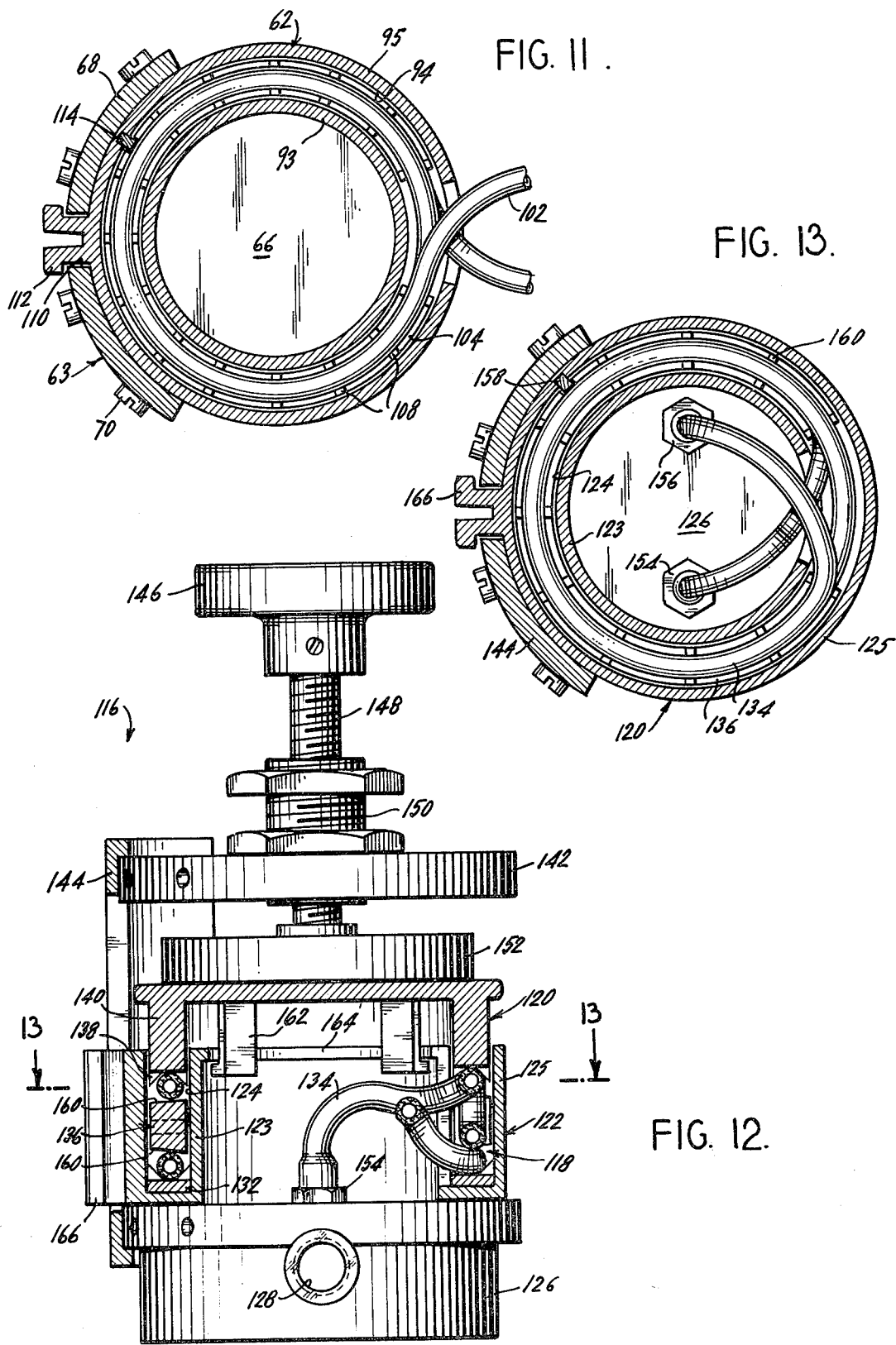

FLUID METERING VALVE

The present invention is related to fluid metering valves capable of fine metering over low flow rates while maintaining full shut-off capability and high resistance to clogging.

Conventional valves utilized for precision metering of fluids typically contain a tapered needle valve assembly. In order to precisely meter the flow of fluid through such valve it is necessary for the space between the needle valve and its seat to be very small at low flow rates. Thus, the valve is easily clogged by particles suspended in the fluid. Further, if fluid containing abrasive particles is caused to pass through conventional needle valves the abrasive particles cause excessive wear on the needle valve and its seat contributing to a short useful life in such environments. Additionally, a precision needle valve, because of the very close tolerances between the needle and its seat, is normally not recommended for full shutoff.

The present invention relates to an improved metering valve structure that utilizes the principle of compressing or nipping a flexible tubing carrying the fluid to be metered in such manner that the cross sectional area of the tubing is varied to change the flow rate of the fluid through the valve. Early attempts to construct fluid metering valves using the principle of nipping the flexible tubing within the valve body have been uniformly unsuccessful in that such valves have not been capable of fine metering of fluids. Further, such prior art devices have either required secondary means for obtaining full shutoff capability, such as the device disclosed in U.S. Pat. No. 2,827,919 to Rice, et al. or they are not capable of full shutoff, such as the device disclosed in U.S. Pat. No. 2,582,917 to F. Aagaard.

It is an object of the present invention to provide a fluid metering valve that overcomes these and other shortcomings of prior art valves. Specifically, it is an object of the present invention to provide a low cost, control valve that is capable of fine metering over a very low flow rate.

It is a further object of the present invention to provide a fluid metering valve that has full shutoff capability.

It is a still further object of the present invention to provide a fluid metering valve that is fully corrosive resistant.

It is a still further object of the present invention to provide a fluid control valve that is capable of control of multiple fluid circuits with a single actuator.

It is a still further object of the present invention to provide a fluid metering valve that has a changeable metering element that can be replaced for repair or for substitution of a metering element that operates at different flow ranges.

It is a still further object of the present invention to provide a fluid metering valve having a construction that is resistant to clogging and therefore can be utilized with slurries, abrasive solutions, suspended solids, biomedical fluids and the like.

It is a still further object of the present invention to provide a fluid metering valve that will have a longer lasting metering element.

In accordance with one embodiment of the present invention there is provided a metering valve for precise control of fluid passing therethrough comprising a body having a tubing receiving channel formed therein, a length of flexible tubing positioned within the channel and extending substantially around said channel from an inlet location to an outlet location. Means are provided within the channel to support the tubing therein and there are a plurality of compression surfaces capable of simultaneously engaging and compressing the tubing at spaced locations within the channel. The compression surfaces are mounted for simultaneous movement parallel to the axis of the annular channel and an actuating means is provided for controlling the engagement of the compression surfaces with the flexible tubing to progressively pinch off the flow of fluid in the tubing as the compression surfaces are caused to compress the flexible tubing; and to progressively open the flexible tubing as the compression surfaces are moved out of engagement with the flexible tubing.

The above brief description as well as further objects, features and advantages of the present invention will be more fully understood by reference to the following detailed description of a presently preferred, but nonetheless illustrative, metering valve in accordance with the present invention when taken in conjunction with the accompanying drawings, wherein:

FIG. 1 is a side elevational view showing one valve of the present invention.

FIG. 2 is a section taken along line 2—2 of FIG. 1 showing the internal parts of the valve.

FIG. 3 is a sectional top view taken along line 3—3 in FIG. 2 showing the routing of the flexible tubing through the interior of the valve body.

FIG. 4 is a fragmentary side elevational view of the valve showing the flexible tubing metering element in the unconstricted position.

FIG. 5 is a fragmentary side elevational view of the valve showing the flexible tubing metering element in the closed condition.

FIG. 6 is a fragmentary sectional view of the cross-section of the flexible tubing in a condition intermediate the open position shown in FIG. 4 and the closed position shown in FIG. 5.

FIG. 11 is a sectional view taken along line 11—11 in FIG. 10.

FIG. 12 is another embodiment of the present invention, partially in section, showing the internal structure of the valve.

FIG. 13 is a sectional view taken along line 13—13 in FIG. 12.

Figure 7:
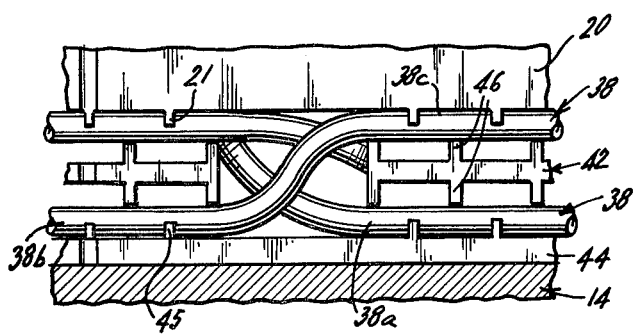
FIG. 7 is a partial section taken along line 7—7 of FIG. 3 showing the routing of the flexible tubing into upper and lower portions of an annular channel formed in valve body.

Referring now specifically to the drawings and in particular, to FIG. 1, there is shown a metering valve embodying features of the present invention generally designated by the reference numeral 10, having an upper body portion 12 and a lower body portion 14. A control knob 16 extending upwardly from upper body portion 12 is provided to vary the flow rate through the metering valve 10. Retaining screw 18 prevents upper body portion 12 and lower body portion 14 from separating from each other but allows compressive relative motion.

As shown in FIG. 2, the upper body portion 12 of metering valve 10 has a flat top surface and substantially cylindrical downwardly extending wall 20. The lower body portion 14 is constructed in a correspondingly shaped cylindrical configuration with upwardly extending inner cylindrical wall 22 and upwardly extending outer cylindrical wall 24 which define annular channel 26 adapted to receive downwardly extending cylindrical wall 20 therein.

The lower body portion 14 contains ports 28, 30 which are cast or molded therein. In accordance with the construction of this embodiment of the metering valve 10, it is possible to utilize either port 28 or 30 as the inlet or outlet as the metering valve 10 will operate in either direction without any loss of efficiency. In those applications where it is advantageous to have one port extending axially from the lower body portion 14 rather than radially as shown in FIG. 2, plug 32 may be removed from axial port 34 provided in the lower body portion 14 and threaded into the threaded portion of port 30.

As best shown by reference to FIGS. 2 and 3, fluid enters port 28 and passes through fitting 36 into flexible tubing 38. The routing of flexible tubing 38 is best shown in FIG. 3. Tubing 38 is attached to fitting 36 and then is directed outwardly into annular channel 26 entering the lower portion of the channel at approximately the six o'clock position shown in FIG. 3. Tubing 38 continues counterclockwise for approximately two full revolutions entering the upper portion of annular channel 26 and exiting, again at the six o'clock position. The other end of flexible tubing 38 is attached to fitting 40, which fitting is threaded into lower portion 14 and leads into port 30. Thus, fluid entering port 28 travels through fitting 36 into flexible tubing 38, through fitting 40 and exits the metering valve 10 through outlet port 30. As discussed above, it is possible for the metering valve to operate with the direction of flow reversed and port 30 operating as the inlet and port 28 as the outlet.

Metering valve 10 controls the flow of fluid passing through flexible tubing 38 by varying the cross sectional area of flexible tubing 38. Specifically, the metering is accomplished by moving upper body portion 12 containing downwardly extending cylindrical wall 20 relative to the annular channel 26 formed in lower body portion 14. The flow rate through metering valve 10 is reduced when downwardly extending cylindrical wall 20 is caused to move further into annular channel 26, thereby causing the topmost run of flexible tubing 28 to come into contact with compression ring 42 (best shown in FIG. 4). Compression ring 42 is caused to engage the bottom run of flexible tubing 38 which bears against centering ring 44. Centering ring 44 abuts the floor of annular channel 26. As downwardly extending cylindrical wall 20 continues to move downward, portions of the cross section of flexible tubing 38 change from the open condition shown in FIG. 4, through an intermediate condition of partial closure shown in FIG. 6 to complete compression and full shutoff shown in FIG. 5. It is anticipated that the full shutoff condition will be effected before downwardly extending cylindrical wall 20 reaches the full extent of its travel against a positive stop (not shown).

Figure 8:
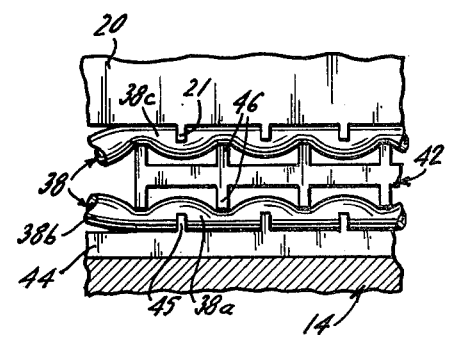
FIG. 8 is a fragmentary sectional view showing the compression surfaces engaged with the flexible tubing to assume a closed position.

As best illustrated in FIGS. 3 and 8, compression ring 42 is comprised of a C-shaped central portion having a plurality of upwardly and downwardly projecting compression surfaces 46 extending therefrom. When downwardly extending cylindrical wall 20 is compressed against lower body portion 14 compression surfaces 46 compress flexible tubing 38 against centering ring 44 and downwardly extending cylindrical wall 20, thereby constricting the flow of fluid through flexible tubing 38.

FIG. 6 illustrates the non-parallel engagement of the compression surface 46 with the top surfaces centering ring 44. The biased angle of contact results in a more gradual and controlled constriction of the flexible tubing 38. If the flat surface of centering ring 44 and the compression surface 46 were parallel, the closure of the metering valve 10 would be more abrupt and, therefore, less desirable.

When compression surfaces 46 engage flexible tubing 38 the non-parallel engagement would tend to cause flexible tubing 38 to move laterally towards the left side of annular channel 26 in FIG. 6. Therefore upwardly projecting centering wedges 45 are provided on centering ring 44 to prevent lateral movement of the bottom run of flexible tubing 38. Similarly, downwardly projecting centering wedges 21 are provided on the bottom surface of downwardly extending cylindrical wall 20 to prevent lateral movement of the top run of flexible tubing 38. As is best shown in FIGS. 7 and 8, centering wedges 21, 45 are located intermediate the corresponding compression surfaces 46 on compression ring 42 and do not directly contribute to the compression of flexible tubing 38.

In the metering valve of the present invention compression ring 42 contains at least thirty compression surfaces 46. As metering valve 10 is closed, the plurality of compression surfaces 46 compress flexible tubing 38 forming a corresponding number of orifices 47. As the number of orifices 47 is increased the valve is capable of becoming even more precise in its ability to meter the flow of fluids passing through the flexible tubing 38.

As control knob 16 is closed each orifice 47 closes the same amount. The anti-clogging feature of the metering valve 10 is achieved by distributing the total pressure drop of the valve over a plurality of orifices 47 in series. Each orifice 47, therefore, operates with a wider opening than that of a standard needle valve at the same flow conditions.

The routing of flexible tubing 38 is apparent from FIG. 7. Specifically, that portion of the flexible tubing designated therein as 38a is directed along the lower portion of the annular channel 26 defined by the bottom of the compression ring 42 and the top of centering ring 44. That portion of the flexible tubing designated as 38b is a continuation of 38a after it has traveled around circumference of the bottom portion of the annular channel 26. Tubing portion 38b is directed above compression ring 42 into the top portion of the annular channel, which portion is defined by the top surface of the compression ring 42 and the bottom surface of downwardly extending cylindrical wall 20 and designated 38c. Tubing portion 38c continues around the circumference of annular channel 26 for a second revolution until the portion designated 38d terminates at fitting 40 (not shown).

During operation of metering valve 10 it is necessary to prevent relative rotation between upper body portion 12 and lower body portion 14. Additionally, it is desirable to prevent either compressing ring 42 or centering ring 44 from rotating relative to the body portions 12, 14. Therefore, a key 56 (best shown in FIG. 3) is provided which engages corresponding keyways in upper body portion 12, lower body portion 14, compression ring 42, and centering ring 44. Key 56 allows relative vertical movement but prevents rotation of any of these components relative to another.

In operation, the embodiment of the metering valve shown in FIGS. 1 through 8 operates in substantially the following manner. To decrease the flow of fluid between ports 28 and 30 control knob 16 is rotated clockwise causing threaded shaft 48 to engage internally threaded member 50. As control knob 16 is rotated further, compression washer 52 bears downwardly against thrust bearing 54 causing downwardly extending cylindrical wall 20 to move deeper into annular channel 26. Consequently, the cross section of flexible tubing 38 in the area of each compression surface 46 forms an orifice 47 and changes from the opened position shown in FIGS. 4 and 7 to fully closed position shown in FIGS. 5 and 8.

Figure 10:
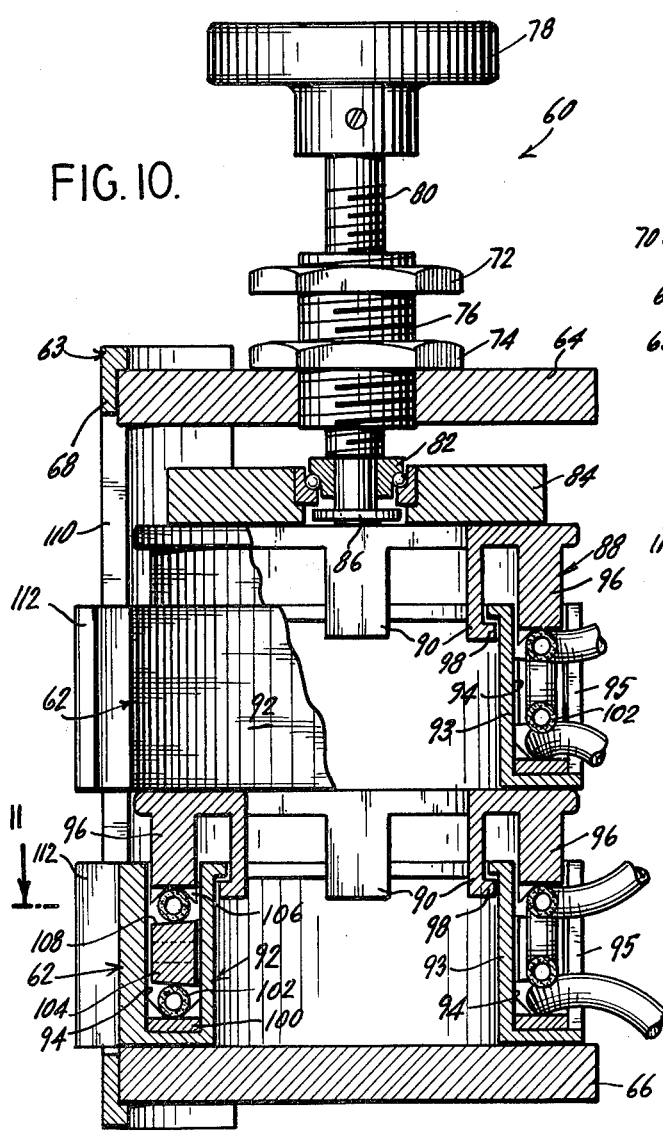
FIG. 10 is a side elevational view of the valve embodiment shown in FIG. 9 (slightly enlarged and rotated approximately 30°) partially in section showing the internal components of the tandem valve assembly.
Figure 9:
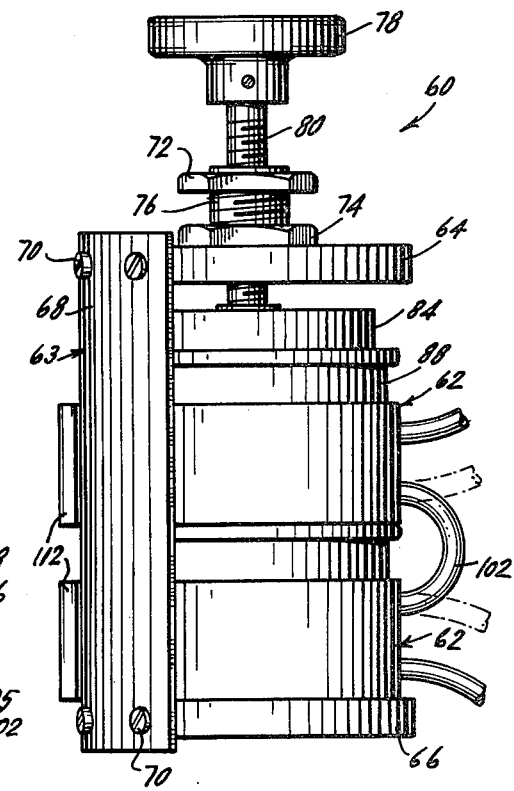
FIG. 9 is a side elevational view of an embodiment of this invention wherein two valve subassemblies are mounted in tandem for actuation by a single control.

FIGS. 9, 10 and 11 are addressed to an alternate embodiment of the metering valve of the present invention. Specifically, FIG. 9 shows a tandem metering valve generally designated by the reference numeral 60. Tandem valve 60 is comprised of two substantially identical valve cartridges 62. The cartridges 62, 62 can be operated in series, as shown in FIG. 9 or in parallel as shown by the routing of the flexible tubing indicated by the phantom lines in FIG. 9.

The valve cartridges 62, 62 are positioned one on top of the other and maintained in such position by a substantially C-shaped frame assembly comprised of top plate 64, bottom plate 66 and connecting bracket 68 fastened together with screws 70. A mounting collar 76 extends upwardly from top plate 64.

Tandem metering valve 60 is attached to a front panel or a control box (not shown) and held in place by nut 72 and lock-nut 74 on mounting collar 76.

To operate tandem metering valve 60 control knob 78, fastened to shaft 80, is rotated. The external threads of shaft 80 cooperate with internal threads in mounting collar 76 whereby clockwise rotation of control knob 78 causes shaft 80 to move downward relative to mounting collar 76. The lower end of shaft 80 terminates in a reduced diameter portion which rotates within thrust bearing 82, press fit within actuating plate 84. The end of shaft 80 is provided with a recess and a corresponding retaining ring 86 which prevents removal of shaft 80 from thrust bearing 82.

As will be described more fully below by reference to FIG. 10, metering is accomplished by movement of actuating plate 84 downward causing compression of each valve cartridge 62, 62. Lower valve cartridge 62 is shown in complete section, so for the sake of clarity, the following description will relate to this assembly although it should be understood that both cartridges are substantially identical. Valve cartridge 62 is comprised of a ring-shaped top body portion 88 having downwardly extending retaining tabs 90 and a corresponding hollow cylindrically shaped bottom body portion 92 with inner and outer cylindrical walls 93 and 95 respectively. The inner and outer cylindrical walls 93, 95 of bottom body portion 92 form an upwardly opening annular channel 94. The upper body portion 88 contains a downwardly extending cylindrical wall 96 which engages annular channel 94. Ring-shaped upper body portion 88 is fastened to bottom body portion 92 by engagement of retaining tabs 90 with an internal lip 98 formed on the inner cylindrical surface of bottom body portion 92. The construction of retaining tabs 90 allows the upper body portion 88 and the lower body portion 92 of subassembly 62 to be removably fastened to each other.

To allow the valve cartridges 62, 62 to move relative to the C-shaped frame 63, connecting bracket 68 contains a vertical slot 110 which is dimensioned to receive Y-shaped spring retainers 112, 112 for vertical sliding motion in slot 110.

As with the embodiment of metering valve 10 shown in FIGS. 1 through 8, annular channel 94 formed in hollow cylindrical body portion 92 contains a centering ring 100, a first run of flexible tubing 102, compression ring 104, a second run of flexible tubing 102 and the bottom surface of downwardly extending cylindrical wall 96 containing centering wedges 106. When control knob 78 is rotated causing actuating plate 84 to move downward, upper body portion 88 moves downward correspondingly, relative to bottom body portion 92. Consequently, downwardly extending cylindrical wall 96 moves more deeply into annular channel 94 thereby compressing the top run of flexible tubing 102 between centering wedges 106 and compression surfaces 108 on compression ring 104 and the bottom run of flexible tubing 102 between compression surfaces 108 and centering ring 100. The amount of flow is proportional to the degree of compression with full shut-off corresponding to full compression. As shown and described in greater detail above, the compression surfaces 108 are inclined relative to the substantially horizontal bottom surface of cylindrical wall 96 and the top surface of centering ring 100.

To prevent rotation of the upper body portion 88, centering ring 100, or compression ring 104 relative to bottom body portion 92, a key 114 is provided in each valve subassembly 62. Corresponding keyways in upper body portion 88, centering ring 100, compression ring 104 and bottom body portion 92 allow relative vertical movement but prevent rotation.

In FIG. 11, the routing of flexible tubing 102 is shown. Although it would be possible to use a bottom body portion having inlet and outlet ports 28, 30 as shown in the embodiments of FIGS. 1 through 8, the tandem metering valve 60 as shown in FIGS. 9 through 11, is constructed to allow flexible tubing 102 to enter the annular channel 94 directly without the necessity for fittings 36, 40 or ports 28, 30. It would, however, be possible to incorporate a bottom body portion similar to that shown in FIGS. 1 through 8 in a tandem metering valve of the type shown in FIGS. 9 through 11.

In the event that flexible tubing 102 needs replacement it is possible to replace just the tubing 102 by rerouting the tubing through annular channel 94. Alternatively, it is possible to replace the entire valve cartridge 62 as a unit or to replace only the bottom body portion 92 containing the worn out flexible tubing 102.

FIG. 12 shows another embodiment of a fluid metering valve of the present invention which is generally designated by the reference numeral 116. This embodiment utilizes a valve subassembly 118 which is comprised of a ring-shaped upper body portion 120 which is substantially identical to the upper body portion 88 comprising the valve cartridge 62 shown in FIGS. 9 through 11. The bottom body portion of fluid metering valve 116, however, is comprised of a metering portion 122 formed from concentric hollow cylindrical inner member 123 and outer member 125 defining in upwardly opening annular channel 124, and a separate base portion 126 containing port 128 and port 130 (not shown).

The annular channel 124 contains substantially the same elements as the annular channel 26 in the metering valve embodiment shown in FIGS. 1 through 8 and annular channel 94 in the metering valve embodiment of FIGS. 9 through 11; namely, a centering ring 132, a first run of flexible tubing 134, a C-shaped compression ring 136, a second run of flexible tubing 134 and a plurality of centering wedges 138 on the bottom-most surface of downwardly extending cylindrical wall 140 of upper body portion 120.

Metering of fluid passing through metering valve 116 is accomplished by downward movement of upper body portion 120 relative to metering portion 122 and base portion 126 within a frame formed by top plate 142 and connecting bracket 144. Specifically, top plate 142 is fastened to connecting bracket 144 and the assembly bolted to base portion 126. As control knob 146 is rotated, externally threaded shaft 148 engages internal threads in mounting collar 150 so that actuating plate 152 is caused to move downwardly thereby compressing valve subassembly 118.

As best shown in FIG. 13, fluid enters port 128, passes through fitting 154 and into flexible tubing 134. Flexible tubing 134 is directed below compression ring 136 into annular channel 134 approximately one revolution around the circumference of metering portion 122 and then above compression ring 136 through the annular channel 134, a second distance again equal to the circumference of the metering portion 122, and into fitting 156 in the base portion 126 of valve subassembly 118. Port 130 (not shown) allows the metered fluid to exit from the fluid metering valve 116.

To prevent rotation of centering ring 132, compression ring 136 and upper body portion 120 relative to metering portion 122, a key 158 is provided which engages corresponding keyways in centering ring 132, compression ring 136 and upper body portion 120 allowing only relative vertical motion.

As in the metering valve of the embodiments shown in FIGS. 1 through 8 and 9 through 11, the metering valve of FIGS. 12 and 13 includes a compression ring 136 having a plurality of upwardly and downwardly projecting compression surfaces 160. Each of these surfaces is biased slightly in such manner that when compression surfaces 160 are caused to contact flexible tubing 134, the surfaces of the compression surfaces 160 are inclined relative to the horizontal top surface of the centering ring 132 or the horizontal bottom surface of downwardly extending cylindrical wall 140.

The fluid metering valve 116 as shown in FIGS. 12 and 13 is comprised of several interchangeable components. For example, upper body portion 120 can be removed from metering portion 122 by deflecting resilient retaining tabs 162 out of contact with inwardly extending lip 164 formed on the inner cylindrical surface of metering portion 122. If substitution of the flexible tubing 134 is desired or necessary, it is possible to either replace just the tubing element in metering portion 122 or to disconnect both ends of the tubing 134 from fittings 154, 156 allowing replacement of the metering portion 122 as an assembly using the same base portion 126 and the same upper body portion 120. It is possible to remove metering portion 122 from the assembly by compressing Y-shaped retainer 166 thereby allowing retainer 166 to be removed from vertical slot 168 in connecting bracket 144.

In all of the embodiments described above, it is possible to replace just the flexible tubing element which is readily accomplished. The flexible tubing can be replaced with a tubing having a different inside diameter to alter the flow metering characteristics of the valve assembly.

The use of a large number of compression surfaces on the compression ring serves to increase the metering precision of the valve assembly as discussed above, and also serves to substantially increase the life of the flexible tubing element. The simultaneous compression of the tubing at a plurality of points distributes the compressive load on the tubing and prevents premature failure of this element.

A latitude of modification, change and substitution is intended in the foregoing disclosure. Accordingly, it is appropriate that the appended claims be construed broadly and in a manner consistent with the spirit and scope of the invention.

What is claimed is:
1. A metering valve for precise control of fluid passing therethrough comprising:
   (a) a body having a tubing receiving channel formed therein;
   (b) a length of flexible tubing positioned within said channel and extending along substantially the entire length of said channel from an inlet location to an outlet location;
   (c) a plurality of planar compression surfaces engageable with said flexible tubing at spaced locations along the length of said tubing, wherein said planes of said plurality of compression surfaces are oblique to a radial plane of said channel and the plane of each adjacent compression surface is inclined in the same direction;
   (d) means mounting said compression surfaces for simultaneous movement relative to said tubing;
   (e) means for centering said flexible tubing in said channel;
   (g) an actuating means for controlling said compression surface movement means to progressively constrict flow of liquid in said tubing if said compression surfaces are moved into compressive engagement with said tubing and to progressively open flow of fluid as said compression surfaces are moved out of engagement with said tubing.

2. A metering valve as recited in claim 1 wherein said body is comprised of a first portion wherein said tubing receiving channel is an annular channel formed therein, and a second cylindrical portion moveable axially upwardly and downwardly relative to said first body portion and receivable in said annular channel of said first body portion.

3. A metering valve as recited in claim 2 wherein said compression surface mounting means is comprised of a substantially C-shaped compression ring having said plurality of compression surfaces projecting therefrom, said ring is positioned in said annular channel and axially moveable relative thereto.

4. A metering valve as recited in claim 1 wherein said centering means includes a plurality of centering wedges projecting into said annular chamber engaging said flexible tubing along its length intermediate the engagement of said compression surfaces with said tubing.

5. A metering valve for precise control of fluid passing therethrough comprising:
   (a) a body having a first body portion and a second body portion, said first body portion having an annular channel formed therein and said second body portion extending into said annular channel and moveable axially relative to said first body portion,
   (b) a C-shaped compression ring positioned in said annular channel,
   (c) a first length of flexible tubing positioned within said annular channel intermediate a bottom surface of said annular channel and said compression ring,
   (d) a second length of flexible tubing operatively connected to said first length of tubing and positioned within said annular channel intermediate said compression ring and said second body portion,
   (e) an inlet and an outlet connected by said first and second length of flexible tubing,
   (f) a first plurality of serially arranged compression surfaces projecting downwardly from said compression ring in engaging relationship with said first length of flexible tubing and a second plurality of serially arranged compression surfaces projecting upwardly from said compression ring in engaging relationship with said second length of flexible tubing,
   (g) means for moving said second body portion into said annular chamber to progressively compress said first and second pluralities of compression surfaces against said first and said second lengths of flexible tubing in said annular chamber thereby constricting flow of fluid from said inlet to said outlet.

6. The metering valve as recited in claim 5 wherein a plane of each plurality of compression surfaces is oblique to a radial plane of said annular channel formed in said first body portion.

7. The metering valve as recited in claim 6 further comprising means for centering said first and said second lengths of tubing in said annular chamber.

8. The metering valve as recited in claim 5 wherein said inlet is comprised of a first fitting operatively mounted to said first body portion and said outlet is comprised of a second fitting operatively connected to said first body portion.

9. The metering valve as recited in claim 8 further including means for releasably connecting said first fitting to said first length of said flexible tubing and said second fitting to said second length of flexible tubing.

10. A tandem metering valve for precise control of fluid passing therethrough comprising:
   (a) a frame,
   (b) at least two valve cartridges mounted to said frame, each of said valve cartridges comprising a body portion having an annular chamber formed therein, a length of flexible tubing in said annular chamber, a plurality of serially arranged compression surfaces in engageable relationship with said flexible tubing, and means for causing said compression surfaces to progressively compress said flexible tubing thereby regulating the flow of fluid through said valve cartridge,
   (c) actuating means on said frame for simultaneously causing the progressive compression of said flexible tubing in each of said valve cartridges.

11. A tandem metering valve as recited in claim 10 further including means removeably mounting each of said at least two cartridges to said frame.

12. A tandem metering valve as recited in claim 11 wherein said flexible tubing in said at least two valve cartridges are connected in parallel.

13. A tandem metering valve as recited in claim 11 wherein said flexible tubing in said at least two valve cartridges are connected in series.

* * * * *